May 10, 1960  E. W. J. BASHAM  2,936,183

COUPLINGS

Filed May 21, 1957

United States Patent Office 2,936,183
Patented May 10, 1960

2,936,183

COUPLINGS

Edgar William James Basham, West Hendford, Yeovil, England, assignor to Normalair Limited, West Hendford, Yeovil, England Application May 21, 1957, Serial No. 660,673

Claims priority, application Great Britain May 26, 1956

3 Claims. (Cl. 284—4)

This invention relates to quick detachable couplings and more particularly though not exclusively to high pressure oxygen charging connections.

One object of the present invention is to provide a detachable high pressure coupling to enable an aircraft oxygen system to be quickly replenished.

Another object of the present invention is to provide a high pressure coupling which does not necessitate the use of other controls.

A further object of the present invention is to provide a high pressure coupling which does not necessitate the use of spanners or other tools.

The invention consists in a quick detachable high pressure coupling device comprising a coupling member mounted on a fixed part of the aircraft and a further ancillary coupling member mounted on an external pipe supply line.

The invention also consists in a quick detachable coupling device as set forth in the preceding paragraph wherein the fixed part comprises valve means and a projecting member provided with communicating passages.

The invention also consists in a quick detachable high pressure coupling as set forth in the first of the two preceding paragraphs wherein the ancillary member comprises a slidably mounted member of substantially the same diameter as the projecting member of the fixed part.

The invention also consists in a quick detachable coupling device as set forth in the preceding paragraph wherein the ancillary member is furnished with a resilient sealing sleeve to form a pressure tight seal on both or either of the aforementioned projecting or slidably mounted members as and when these are inserted or withdrawn.

The invention also consists in a quick detachable high pressure coupling as set forth in the two preceding paragraphs wherein the operating details generally are enclosed in a rotatable sleeve furnished with an external thread at one end for engagement with the aforementioned threaded shroud on the aforementioned fixed member.

The invention also consists in a quick detachable high pressure coupling substantially as hereinafter described with reference to the drawings accompanying the specification in which.

Figure 1:
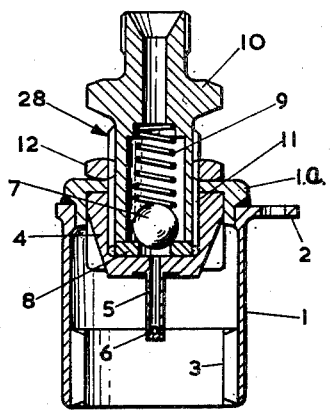
Fig. 1 is a sectional drawing of the fixed or "aircraft" unit.
Figure 2:
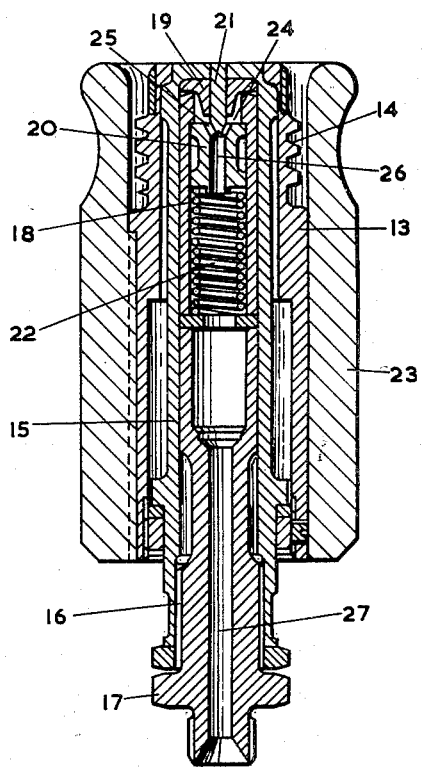
Fig. 2 is a sectional drawing of the ancillary or "ground" unit.

In carrying the invention into effect according to one convenient form by way of example as illustrated in Figs. 1 and 2 we provide a quick release coupling with one member, as illustrated in Fig. 1, mounted on the aircraft and a second member, as illustrated in Fig. 2, for connection to a ground charging equipment. The fixed unit, Fig. 1, comprises a tubular sleeve 1 and 1a and provided with a flange 2 for fixing the unit to a rigid part of the aircraft and provided with an internal three start thread 3, located within sleeve 1 is a tapered portion 4 from which projects a hollow probe 5 furnished with four radial holes 6 communicating with the passage within the probe 5, within portion 4 is located a non-return valve, generally indicated at 28, comprising a ball 7 seating 8 and spring 9 surrounded by union 10 which is screwed into portion 4 at 11 and locked by lock-nut 12, the other end of union 10 is threaded to accommodate a tube union, not shown, which is in communication with the oxygen equipment of the aircraft. As illustrated in Fig. 2 we provide the ancillary or ground equipment unit of the coupling, this comprising an outer sleeve 13 furnished at one end with a three start thread 14, corresponding with thread 3 in Fig. 1, and rotatably mounted within sleeve 13 is a blank ended sleeve 15 furnished with a small hole to accommodate probe 21 at the blank and threaded at the other end at 16 to accommodate a union 17, having a duct 27 throughout its length, this unit also serves to retain the internal details 18 and 19 in position. Within sleeve 15 is located a further sleeve 18 which retains a pliable sealing sleeve 19 in position and within sleeve 18 is slidably located a plunger 20 having a forward extending solid probe 21 provided with four holes 25 communicating with compartment 26. Plunger 20 is retained in position by spring 22 with probe 21 thrust through the sealing sleeve 18 so forming a pressure tight seal.

This ancillary or ground unit, Fig. 2, is encased in a rubber hand grip 23 for convenience of operation and to safeguard the coupling from damage through careless handling.

In operation, as the ancillary or ground unit, Fig. 2 is screwed into the fixed unit, Fig. 1, probe 5 presses the solid probe 21, together with plunger 20 and spring 22, inwards until probe 5 is sufficiently far through the sealing sleeve 19 to expose radial holes 6 to the compartment 24, so allowing high pressure oxygen, from the ground service to pass down duct 27 through passage 26 and holes 25 into compartment 24 and from thence down the hollow probe 5, via holes 6, so through the non-return valve 28 into the aircraft oxygen system, via union 10, to replenish the system. The non-return 28 seals the system and prevents leakage when the ground unit is detached. In like manner as the ground unit Fig. 2, is unscrewed and probe 5 withdraws it is followed up by the solid probe 21, which is pressed into continuous contact with it by spring 22, until probe 21 is again through sealing sleeve 19 so preventing any leakage of oxygen. In the disconnect or off position the length of probe 21 is such that the end forms a flush surface on the end of the unit thus minimising the ingress of moisture and foreign matter. It will be noted that during coupling and withdrawal of the units that one probe is never clear of the sealing sleeve 19 until the corresponding probe is well within the sleeve so that no leakage of oxygen can take place during the process.

Control of the flow is effected by rotation of the hand grip which will control the degree of opening. A finer adjustment, if required, can be obtained by staggering longitudinally the radial holes 6.

Whilst the foregoing has been a description of the invention as applied generally to high pressure oxygen connections it is pointed out that the invention is equally applicable to other uses, for example the control of the flow by the action of the seal 19 on the radial probe holes 6 can be used to produce a reliable control valve or "on" "off" cock which provides a low operating torque trouble free gland and with no seat to be damaged by over tightening.

What I claim and desire to secure by Letters Patent is:

1. A coupling including first and second members interconnecting fluid communication means, said first member comprising first tubular means having one end thereof closed, said closed end having a hole therethrough, second flexible tubular means fixedly mounted within said first tubular means adjacent said hole and having a bore equal in diameter and in axial registry with said hole, and third slidable tubular means mounted within said first tubular means and urged toward said second tubular means, said third tubular means having a first probe mounted at its forward end for tight insertion in said bore and said hole, said second member comprising means for displacing said probe from said hole and said bore with engagement of said members, said displacing means including a second probe corresponding to said first probe but hollow and having at least one hole therethrough, and valve means operatively communicating with said second probe for controlling the flow of fluid therethrough.

2. A coupling according to claim 1 wherein said first tubular means is externally threaded, said second member further comprising means threaded for female engagement with said first tubular means, said second probe separating said first probe from said bore commensurate with the extent of said female engagement.

3. A coupling according to claim 2 wherein said valve means comprises a ball valve operatively communicating with said hollow second probe, said valve opening in response to fluid flow through said second probe.

References Cited in the file of this patent

UNITED STATES PATENTS

| | | |
|---|---|---|
| 804,272 | Schwarz | Nov. 14, 1905 |
| 1,929,854 | Rogers | Oct. 10, 1933 |
| 2,485,006 | Main et al. | Oct. 18, 1949 |
| 2,505,093 | Brock | Apr. 25, 1950 |
| 2,679,408 | Jacobi et al. | May 25, 1954 |